(12) United States Patent
Park

(10) Patent No.: US 9,590,784 B2
(45) Date of Patent: Mar. 7, 2017

(54) METHOD AND DEVICE FOR CONTROLLING THE TRANSCEPTION OF MULTIPLE PIECES OF CONTROL INFORMATION IN A WIRELESS COMMUNICATION SYSTEM

(75) Inventor: Donghyun Park, Seoul (KR)

(73) Assignee: Pantech Inc., Seoul (KR)

( * ) Notice: Subject to any disclaimer, the term of this patent is extended or adjusted under 35 U.S.C. 154(b) by 234 days.

(21) Appl. No.: 14/114,080

(22) PCT Filed: Mar. 19, 2012

(86) PCT No.: PCT/KR2012/001944
§ 371 (c)(1),
(2), (4) Date: Nov. 6, 2013

(87) PCT Pub. No.: WO2012/148083
PCT Pub. Date: Nov. 1, 2012

(65) Prior Publication Data
US 2014/0050188 A1 Feb. 20, 2014

(30) Foreign Application Priority Data
Apr. 25, 2011 (KR) .................. 10-2011-0038536

(51) Int. Cl.
*H04L 5/00* (2006.01)
(52) U.S. Cl.
CPC .......... *H04L 5/0053* (2013.01); *H04L 5/0094* (2013.01); *H04L 5/001* (2013.01)
(58) Field of Classification Search
None
See application file for complete search history.

(56) References Cited

U.S. PATENT DOCUMENTS

| 8,897,272 B2 * | 11/2014 | Zhang et al. .................. 370/336 |
| 2010/0232373 A1* | 9/2010 | Nory .................. H04W 72/1289 370/329 |

(Continued)

FOREIGN PATENT DOCUMENTS

KR   10-2010-0121419   11/2010

OTHER PUBLICATIONS

International Search Report issued on Oct. 29, 2012 in the International Application No. PCT/KR2012/001944.

(Continued)

*Primary Examiner* — Noel Beharry
*Assistant Examiner* — Wilfred Thomas
(74) *Attorney, Agent, or Firm* — H.C. Park & Associates, PLC

(57) ABSTRACT

The present invention relates to a method and device for dynamically controlling the multiple transmission of control information in a wireless communication system. The method for controlling the transception of multiple physical uplink control channels (PUCCHs) in a wireless communication system comprises: a base station transmitting instruction information, which controls the transmission of multiple PUCCHs, to a user terminal that performs the transmission of multiple PUCCHs through either a physical downlink control channel (PDCCH), a medium access control (MAC) layer, or radio resource control (RRC) signaling; and receiving multiple PUCCHs from said user terminal according to a multiple transmission instruction in said instruction information. Said instruction information transmitted through said physical channel is characterized by being either a field corresponding to 1- or 2-bit information constituting a physical downlink control channel (PDCCH) signal, or a field constituting a PDCCH signal scrambled (Continued)

using a PUCCH cell radio network temporary identifier (C-RNTI).

8 Claims, 15 Drawing Sheets

(56) References Cited

U.S. PATENT DOCUMENTS

| | | |
|---|---|---|
| 2010/0272019 A1* | 10/2010 | Papasakellariou et al. .. 370/328 |
| 2011/0122802 A1* | 5/2011 | Ueda et al. ................ 370/310.1 |
| 2011/0235599 A1* | 9/2011 | Nam .................... H04L 1/0027 370/329 |
| 2011/0292902 A1 | 12/2011 | Yang et al. |
| 2011/0310759 A1* | 12/2011 | Gerstenberger et al. ..... 370/252 |
| 2012/0327916 A1* | 12/2012 | Ahn et al. .................... 370/336 |

OTHER PUBLICATIONS

Ericsson, "Evaluation of PUCCH Proposals for Carrier Aggregation", 3Gpp TSG-RAN WG1#61, R1-102612, May 10-14, 2010, Montreal, Canada.

Nokia Siemens Networks, "On Simultaneous PUSCH and PUCCH and clustered SC-FDMA", 3GPP TSG-RAN WG1 Meeting #60bis, R1-101876, Apr. 12-16, 2010, Beijing P.R. China.

* cited by examiner

METHOD AND DEVICE FOR CONTROLLING THE TRANSCEPTION OF MULTIPLE PIECES OF CONTROL INFORMATION IN A WIRELESS COMMUNICATION SYSTEM

CROSS-REFERENCE TO RELATED APPLICATIONS

This application is the National Stage Entry of International Application PCT/KR2012/001944, filed on Mar. 19, 2012, and claims priority from and the benefit of Korean Patent Application No. 10-2011-0038536, filed on Apr. 25, 2011, both of which are incorporated herein by reference in their entireties for all purposes as if fully set forth herein.

BACKGROUND

Field

The present invention relates to a method and apparatus for controlling transceiving of multiple control information in a wireless communication system that uses one or a plurality of component carriers (CCs).

Discussion of the Background

As communication systems have developed, various wireless terminals have been utilized by consumers such as companies and individuals.

Current mobile communication systems, for example, 3GPP, LTE (Long Term Evolution), LTE-A (LTE-Advanced), and the like, may be high capacity communication systems capable of transmitting and receiving various types of data such as image data, wireless data, and the like, beyond providing a sound-based service. Accordingly, there is a desire for a technology that transmits high capacity data, which is comparable to a wired communication network. Also, the system is required to include an appropriate error detection scheme that minimizes a loss of information and increases transmission efficiency of the system so as to enhance performance of the system.

Also, there are provided various technologies for determining whether transceived information is accurately received. As a communication system has developed, a technology that flexibly and extensively determines transceived information has been required. Particularly, in a case in which a plurality of antennas are used or various carriers are utilized, as an amount of transceived data increases, an amount of control information for transceiving each piece of data also increases. Therefore, there is a desire for a method that performs multiple transceiving of control information so as to effectively exchange the control information among devices.

SUMMARY

The present invention relates to a wireless communication system, and an aspect of the present invention is to provide a user equipment and a base station that control transceiving of multiple control information based on a transmission environment in a wireless communication system, and a controlling method required when the devices performs multiple transceiving of control information.

In accordance with an aspect of the present invention, there is provided a method of controlling transceiving of multiple PUCCHs in a wireless communication system, the method including: transmitting, by a base station, instruction information that controls transmission of multiple PUCCHs (Physical Uplink Control CHannel) to a user equipment that is to perform transmission of multiple PUCCHs through a PDCCH (Physical Downlink Control Channel) which is a physical channel, a MAC (Medium Access Control) layer which is an upper layer of the physical channel, or RRC (Radio Resource Control) signaling; and receiving multiple PUCCHs from the user equipment based on a multiple transmission instruction of the instruction information, wherein the instruction information transmitted through the physical channel is a field corresponding to information of 1 or 2 bits in a field forming the PDCCH (Physical Downlink Control Channel) signal, or is a field forming a PDCCH signal scrambled by a PUCCH C-RNTI (Cell Radio Network Temporary Identifier).

In accordance with another aspect of the present invention, there is provided a method of controlling transceiving of multiple PUCCHs in a wireless communication system, the method including: receiving, by a user equipment, instruction information that controls transmission of multiple PUCCHs (Physical Uplink Control CHannel) from a base station through a PDCCH (Physical Downlink Control CHannel) which is a physical channel, a MAC (Medium Access Control) layer which is an upper layer of the physical channel, or RRC (Radio Resource Control) signaling; and transmitting multiple PUCCHs to the base station based on a multiple transmission instruction of the instruction information, wherein the instruction information received through the physical channel is a field corresponding to information of 1 or 2 bits in a field forming a PDCCH (Physical Downlink Control Channel) signal, or is a field forming a PDCCH signal scrambled by a PUCCH C-RNTI (Cell Radio Network Temporary Identifier).

In accordance with another aspect of the present invention, there is provided an apparatus for controlling transceiving of multiple PUCCHs in a wireless communication system, the apparatus including: a controller that generates instruction information for controlling transmission of multiple PUCCHs (Physical Uplink Control CHannel) for a user equipment that is to perform transmission of multiple PUCCHs; a transmitting unit that transmits the generated instruction information through a physical Downlink Control Channel (PDCCH) which is a physical channel, a MAC (Medium Access Control) layer that is an upper layer of the physical channel, or RRC (Radio Resource Control) signaling; and a receiving unit that receives the multiple PUCCHs from the user equipment based on a multiple transmission instruction of the instruction information, wherein the instruction information transmitted through the physical channel is a field corresponding to information of 1 or 2 bits in a field forming a PDCCH (Physical Downlink Control Channel) signal or is a field forming a PDCCH signal scrambled by a PUCCH C-RNTI (Cell Radio Network Temporary Identifier).

In accordance with another aspect of the present invention, there is provided an apparatus for dynamically controlling transceiving of multiple PUCCHs in a wireless communication system, the apparatus including: a transmitting unit that transmits multiple PUCCHs (Physical Uplink Control CHannel) to a base station; a receiving unit that receives, from the base station, instruction information that controls transmission of multiple PUCCHs through a PDCCH (Physical Downlink Control Channel), a MAC (Medium Access Control) layer that is an upper layer of the physical channel, or RRC (Radio Resource Control) signaling; and a controller that controls the transmitting unit to transmit multiple PUCCHs to the base station based on a multiple transmission instruction of the instruction information, wherein the instruction information received through the physical channel is a field corresponding to information of 1 or 2 bits in a field forming a PDCCH (Physical Downlink Control Channel) signal or is a field forming a PDCCH signal scrambled by a PUCCH C-RNTI (Cell Radio Network Temporary Identifier).

DETAILED DESCRIPTION OF THE ILLUSTRATED EMBODIMENTS

Figure 1:
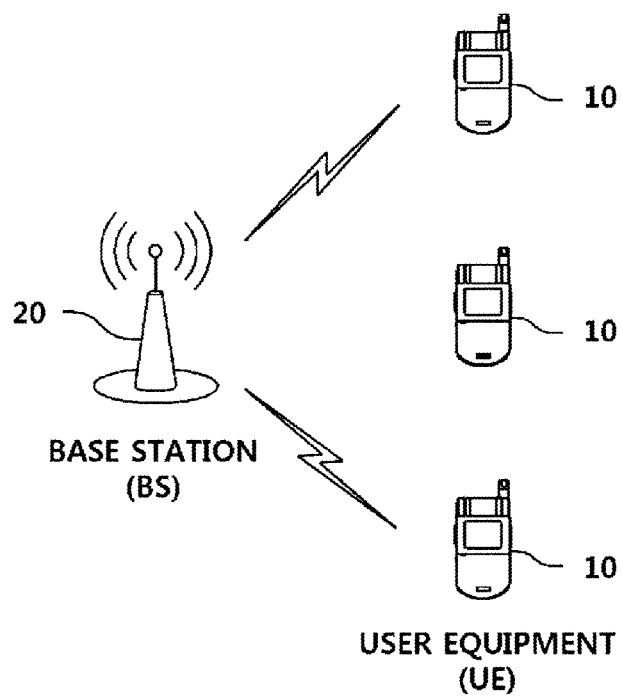
FIG. 1 illustrates a wireless communication system according to embodiments of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a wireless communication system according to embodiments of the present invention.

The wireless communication system may be widely installed so as to provide various communication services, such as a voice service, packet data, and the like.

Referring to FIG. 1, the wireless communication system includes a User Equipment (UE) 10 and a Base Station (BS or eNB) 20. Throughout the specifications, the user equipment 10 may be an inclusive concept indicating a user terminal utilized in wireless communication, including a UE (User Equipment) in WCDMA, LTE, HSPA, and the like, and an MS (Mobile Station), a UT (User Terminal), an SS (Subscriber Station), a wireless device, and the like in GSM.

The base station 20 or a cell may refer to a station where communication with the user equipment 10 is performed, and may also be referred to as a Node-B, an eNB (evolved Node-B), a sector, a site, a BTS (Base Transceiver System), an access point, a relay node, and the like.

That is, the base station 20 or the cell may be construed as an inclusive concept including a partial area covered by a BSC (Base Station Controller) in CDMA, a NodeB of WCDMA, an eNB or a sector (site) in LTE, and the like, and may be a concept including various coverage areas such as a mega cell, a macro cell, a micro cell, a pico cell, a femto cell, a communication range of a relay node, and the like.

In the specifications, the user equipment 10 and the base station 20 are used as two inclusive transceiving subjects, which are to embody the technology and technical concepts described in the specifications, and may not be limited to a predetermined term or word. The user equipment 10 and the base station 20 are used as two inclusive transceiving subjects in an Uplink (UL) and a Downlink (DL), which are used to embody the technology and technical concepts described in the specifications, and may not be limited to a predetermined term or word.

The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like.

Uplink transmission and downlink transmission may be performed based on a TDD (Time Division Duplex) scheme that performs transmission based on different times, or based on an FDD (Frequency Division Duplex) scheme that performs transmission based on different frequencies.

An embodiment of the present invention may be applicable to resource allocation in asynchronous wireless communication that is advanced through GSM, WCDMA, and HSPA, to be LTE and LTE-advanced, and may be applicable to resource allocation in synchronous wireless communication that is advanced through CDMA and CDMA-2000, to be UMB. Embodiments of the present invention may not be limited to a specific wireless communication field, and may be applicable to all technical fields to which a technical idea of the present invention is applicable.

In LTE, a standard may be developed by forming an uplink (UL) and a downlink (DL) based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

LTE uses a standard based on a single carrier as a base and has discussed coupling of a few bands having a bandwidth of 20 MHz or less, whereas LTE-A has discussed a band of a component carrier having a bandwidth of 20 MHz or more. LTE-A has discussed a multiple-carrier aggregation by taking backward compatibility into consideration based on the base standard of LTE. In an uplink and a downlink, a maximum of 5 carriers are taken into consideration. The number of carriers may be increased or decreased from 5 carriers based on a system environment, and the present invention may not be limited thereto.

In a case of the carrier aggregation in LTE-A, a plurality of component carriers exist and an amount of control information transmitted through a control channel of an uplink increases based on a number of the carriers. Although the number of pieces of control information increases, transmission of control information takes at least a predetermined period of time when the pieces of information are sequentially transmitted. Hereinafter, a method of dynamically controlling simultaneous transmission of control information will be described. Without a dynamic control of the simultaneous transmission of control information, rapid increase in an amount of control information may not be appropriately coped with.

For demystifying the descriptions, the present specification describes a method of controlling multiple PUCCH transmission using control information within a single subframe or within a predetermined period of time, from a perspective of a PUCCH used in an LTE or LTE-A system. Hereinafter, a base station will be described from a perspective of an eNB, and a user equipment is described from a perspective of a UE. Here, multiple PUCCH transmission refers to transmission of a plurality of different PUCCHs, that is, multiple transmission of PUCCHs. An eNB may receive multiple PUCCHs, which means multiple reception of PUCCHs.

An embodiment of the present invention may be applied to a component carrier aggregation (hereinafter "CA"). The CA refers to an environment where a base station and a user equipment transmit and receive a signal using a plurality of component carriers. The plurality of component carriers may be adjacent to one another, or may not be adjacent to one another since a frequency band is spaced apart from one another. Also, a downlink component carrier and an uplink component carrier exist independently and thus, a number of downlink component carriers and a number of uplink component carriers may be the same as or different from one another. The plurality of component carriers may include at least one primary component carrier (PCC) and at least one secondary component carrier (SCC) which is different from the PCC. A main measurement signal or control information may be transceived through a PCC, and an SCC may be allocated through a PCC.

An embodiment of a method in which an eNB informs a UE of simultaneous transmission of two or more PUCCHs is a method using a PDCCH. Hereinafter, control information transmitted through a PDCCH is referred to as a Downlink Control Information (DCI), and a purpose of a DCI is different based on a format. Hereinafter, transceiving of a signal through a channel such as a PDCCH, a PDSCH, a PUCCH, and a PUSCH will be described as PDCCH transceiving or transmission, PDSCH transceiving or transmission, PUCCH transceiving or transmission, and PUSCH transceiving or transmission, respectively.

Figure 2:
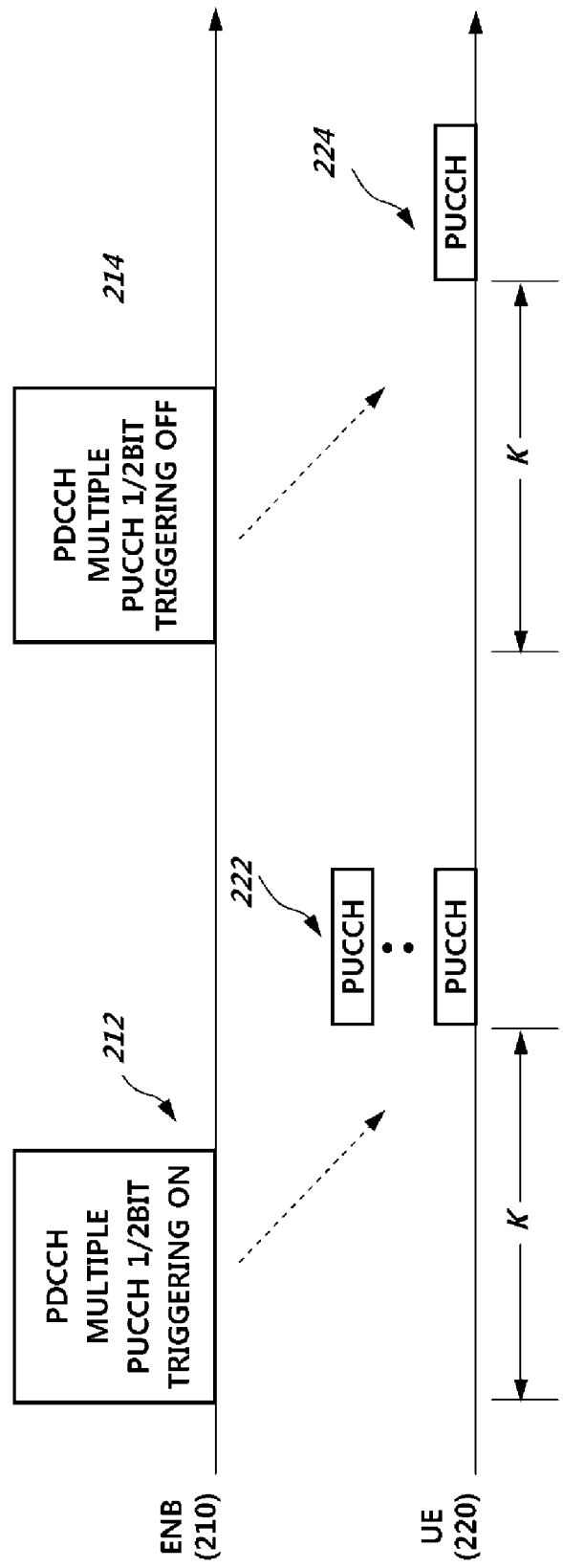
FIG. 2 is a diagram illustrating that multiple PUCCH transmission is dynamically controlled by adding instruction information to a PDCCH according to an embodiment of the present invention.

FIG. 2 is a diagram illustrating that multiple PUCCH transmission is dynamically controlled by adding instruction information to a PDCCH according to an embodiment of the present invention. For the multiple PUCCH transmission in FIG. 2, a triggering bit which is instruction information is added to a PDCCH and an eNB 210 performs signaling whether to perform multiple PUCCH transmission to a UE 220. That is, 1 bit or 2 bits are added to DCI formats included in a UE-specific search space, and the added bit may be used as a triggering bit that instructs multiple PUCCH transmission. This may be applied to all DCI formats. A DCI format required for DL allocation may be preferably applied, but not always and may be applied to various DCI formats for triggering multiple PUCCH transmission.

FIG. 2 illustrates a process in which a PDCCH and a PUCCH are transmitted. For ease of description, a PDSCH and a PUSCH are not included in the drawing. When PDSCH transmission and PUSCH transmission are required based on a transmission environment of an eNB and a UE or necessity, the PDSCH and the PUSCH may also be included. In FIG. 2, an eNB 210 transmits a PDCCH as shown in the diagram 212. In this example, a PDSCH may exist, optionally. In the diagram 212, a triggering bit that instructs multiple PUCCHs is On. A detailed configuration of the triggering bit will be described later. The triggering bit is On and thus, a UE 220 transmits multiple PUCCHs after a predetermined period of time, as shown in the diagram 222. When the eNB 210 turns the multiple PUCCH triggering bit off and transmits a PDCCH as shown in the diagram 214, the UE 220 transmits a single PUCCH as shown in the diagram 224. Here, a time interval (k) between a point in which the UE 220 receives a PDSCH indicated by the PDCCH of the diagram 212 and a point of transmitting A/N transmission through the PUCCH of the diagram 222, and a time interval (k) between a point of receiving the PDCCH of the diagram 214 and a point of transmitting A/N transmission through the PUCCH of the diagram 224 are different depending on whether a transmission scheme is FDD or TDD. That is, in a subframe n, when a UE receives a PUSCH indicated by a PDCCH and transmits A/N transmission with respect to the PUSCH through a PUCCH, a transmission point in time of the PUCCH is in a subframe n+k. When a transmission scheme is FDD, k may be 4 and when the transmission scheme is TDD, k may be set as shown in Table 1 based on TDD UL/DL configuration.

TABLE 1

| UL-DL Configu- | Subframe n | | | | | | | | | |
|---|---|---|---|---|---|---|---|---|---|---|
| ration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 3:
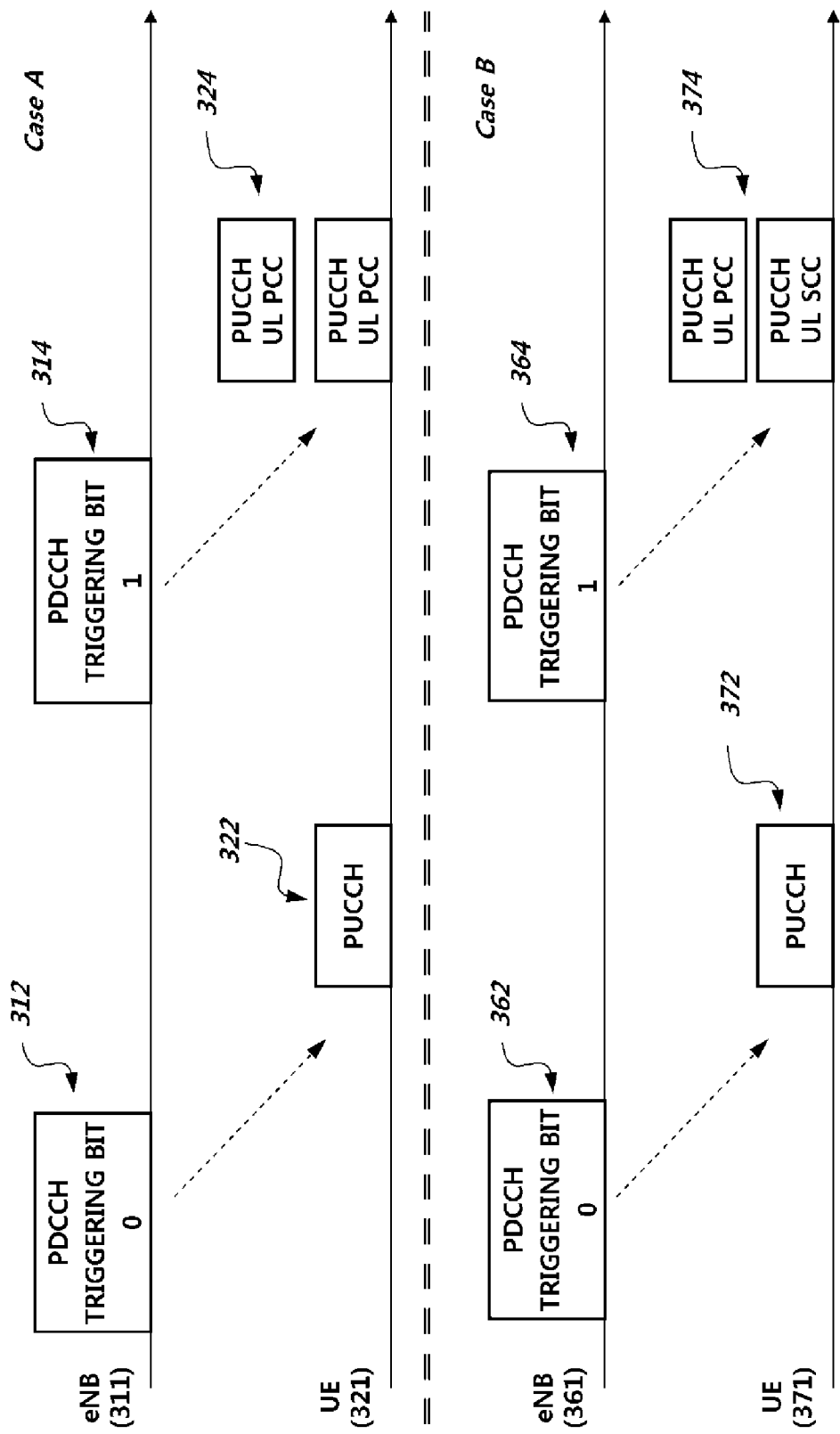
FIG. 3 is a diagram illustrating an example of controlling multiple PUCCH transmission by adding 1 bit to a DCI format according to an embodiment of the present invention.

FIG. 3 is a diagram illustrating an example that controls multiple PUCCH transmission by adding 1 bit to a DCI format according to an embodiment of the present invention.

As described above, an eNB adds 1 bit to a DCI format, and uses the added 1 bit as instruction information that controls multiple PUCCH transmission. The multiple PUCCH transmission may be performed in various schemes: i) a case in which multiple PUCCHs are transmitted in a PCC; ii) a case in which multiple PUCCHs are transmitted in a PCC and an SCC; and the like. Table 2 shows a configuration of 1 bit triggering bit information that instructs multiple PUCCH transmission in a single UL PCC.

TABLE 2

| Triggering bit information (1 Bit state) | Meaning |
| --- | --- |
| 0 | Instruct transmission of single PUCCH (Single PUCCH transmission (No triggering)) |
| 1 | Instruct multiple PUCCH transmission (Multiple PUCCH transmission, 2 PUCCH transmission on UL PCC in one UL subframe or RRC configuration) |

An example that operates based on the setting of Table 2 corresponds to Case A of FIG. 3. When an eNB 311 sets, to '0', a 1 bit triggering bit added to a PDCCH as shown in the diagram 312, it is a state in which multiple PUCCH transmission is not triggered (not triggering) as shown in Table 2 and thus, a UE 321 transmits a single PUCCH as shown in the diagram 322. When the eNB 311 sets, to '1', the 1 bit triggering bit added to the PDCCH as shown in the diagram 314, multiple PUCCH transmission is triggered as shown in Table 2. Therefore, multiple transmission of two PUCCHs is performed on a UL PCC as shown in the diagram 324. When the triggering bit is '1', multiple PUCCH transmission may be performed based on a scheme set by the eNB 311 and the UE 321 in an uplink signaling process such as an RRC and the like. Hereinafter, when multiple PUCCH transmission is performed based on an RRC configuration, this indicates that information associated with a number of PUCCH transmissions to be performed in which CC through an RRC is shared between an eNB and a UE. Here, at least one CC may be used, and when a length of a triggering bit increases, at least one multiple PUCCH transmission environment may be variously configured. For example, when two schemes of multiple PUCCH transmissions are set through an RRC, a first RRC configuration sets a scheme of transmitting K PUCCHs on CC1 and a second RRC configuration sets a scheme of transmitting N and M PUCCHs on CC1 and CC2, respectively.

In addition to the RRC configuration, a multiple PUCCH transmission scheme instructed by a triggering bit may be set to be appropriate for a network environment. That is, unlike Table 2, the setting of Table 3 may be available, of which a corresponding process is illustrated in Case B of FIG. 3.

TABLE 3

| Triggering bit information (1 Bit state) | Meaning |
| --- | --- |
| 0 | Instruct transmission of single PUCCH (Single PUCCH transmission (No triggering)) |

TABLE 3-continued

| Triggering bit information (1 Bit state) | Meaning |
| --- | --- |
| 1 | Instruct multiple PUCCH transmission (1 PUCCH is transmitted on UL PCC and 1 PUCCH is transmitted in UL SCC, or transmitted based on multiple PUCCH transmission scheme set by RRC) (Multiple PUCCH transmission, 1 PUCCH transmission on UL PCC and 1 PUCCH transmission on UL SCC in one UL subframe or RRC configuration) |

In Case B of FIG. 3, when an eNB 361 sets, to '0', a 1 bit triggering bit added to a PDCCH as shown in the diagram 362, it is a state in which multiple PUCCH transmission is not triggered (no triggering) and thus, a UE 371 transmits a single PUCCH as shown in the diagram 372. When the eNB 361 sets, to '1', the 1 bit triggering bit added to the PUCCH as shown in the diagram 364, multiple PUCCH transmission is triggered as shown in Table 3. Therefore, multiple transmission of two PUCCHs is performed as shown in the diagram 374. Unlike Case A, 1 PUCCH transmission is performed on a UL PCC and 1 PUCCH transmission is performed on a UL SCC. When the triggering bit is set to '1', multiple PUCCH transmission is performed based on a scheme set in an uplink signaling process such as RRC and the like, as described above.

Various embodiments using a scheme that uses a 1 bit triggering bit are described as follows. This may instruct PUCCH transmission on a PCC and on a plurality of SCCs such as an SCC1, an SCC2, and the like, in addition to multiple PUCCH transmission on a PCC or an SCC as shown in Table 2 and Table 3.

Figure 4:
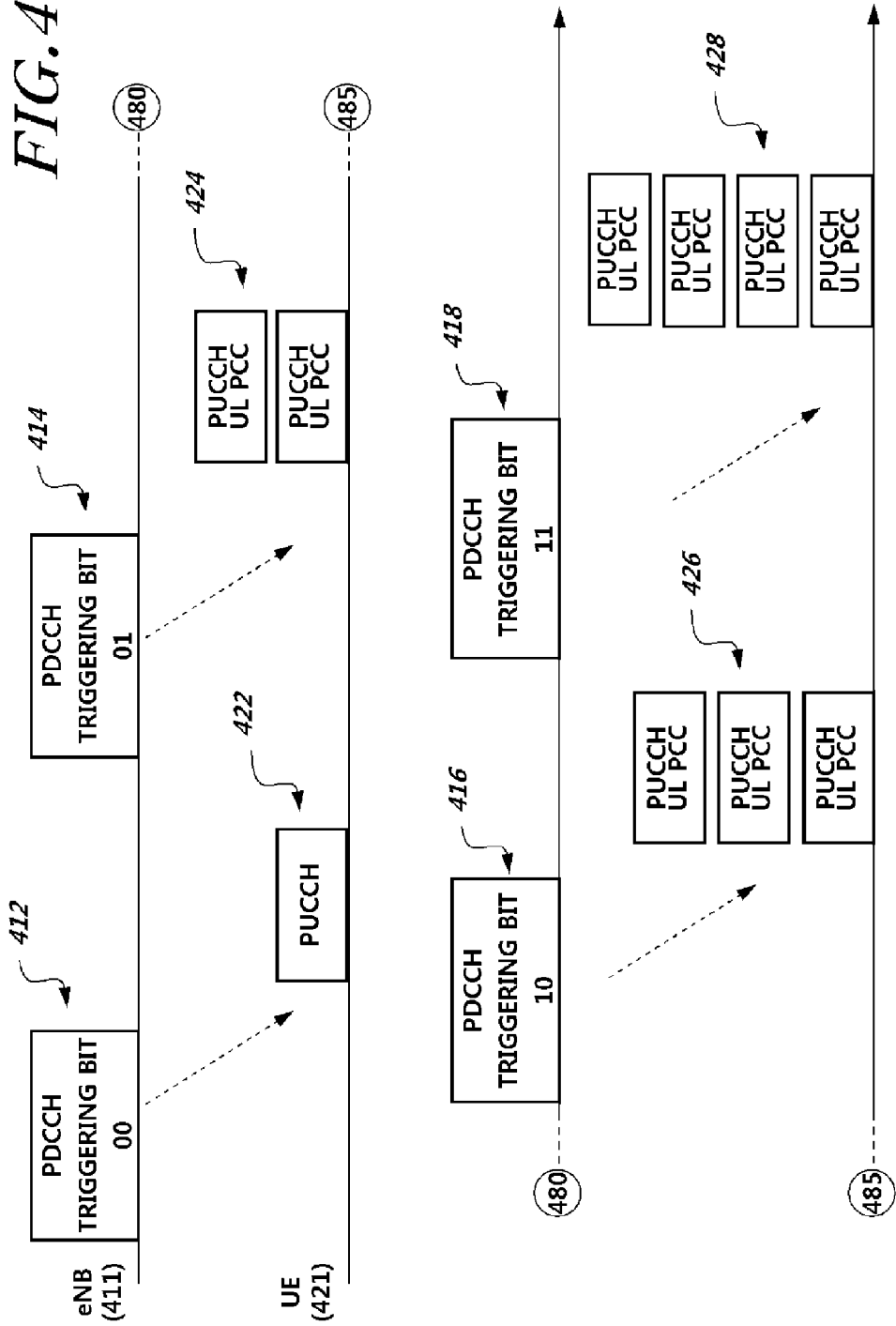
FIG. 4 is a diagram illustrating an example of controlling multiple PUCCH transmission by adding 2 bits to a DCI format according to an embodiment of the present invention.

FIG. 4 is a diagram illustrating an example that controls multiple PUCCH transmission by adding 2 bits to a DCI format according to an embodiment of the present invention. Unlike Table 2 and Table 3 of FIG. 3, PUCCH transmission is controlled by two bits and thus, multiple PUCCH transmission may be instructed by three pieces of information out of the four pieces of information expressed by two bits. An embodiment of setting a triggering bit is as shown in Table 4.

TABLE 4

| Triggering bit information (2 bit state) | Meaning |
| --- | --- |
| 00 | Instruct transmission of single PUCCH (no triggering) (Single PUCCH transmission (No triggering)) |
| 01 | Instruct multiple PUCCH transmission (two PUCCHs are transmitted on UL PCC or transmitted based on multiple PUCCH transmission scheme set by RRC) (Multiple PUCCH transmission, 2 PUCCH transmission no UL PCC in one UL subframe or RRC configuration) |
| 10 | Instruct multiple PUCCH transmission (3 PUCCHs are transmitted on UL PCC or transmitted based on multiple PUCCH transmission scheme set by RRC) (Multiple PUCCH transmission, 3 PUCCH transmission on UL PCC in one UL subframe or RRC configuration) |
| 11 | Instruct multiple PUCCH transmission (4 PUCCHs are transmitted on UL PCC or transmitted based on multiple PUCCH transmission scheme set by RRC) (Multiple PUCCH transmission, 4 PUCCH transmission on UL PCC in one UL subframe or RRC configuration) |

As shown in FIG. 4, when an eNB 411 sets, to '00', a 2-bit triggering bit added to a PDCCH as shown in the diagram 412, it indicates a state in which multiple PUCCH transmission of Table 4 is not triggered (no triggering) and thus, a UE 421 transmits a single PUCCH as shown in the diagram 422. When the eNB 411 sets, to '01', the 2-bit triggering bit added to the PDCCH, as shown in the diagram 414, multiple PUCCH transmission is instructed and multiple PUCCH transmission is triggered. Therefore, as shown in the diagram 424, multiple transmission of two PUCCHs is performed on a UL PCC. When the eNB 411 sets the 2-bit triggering bit added to the PDCCH to '10' as shown in the diagram 416, multiple transmission of three PUCCHs is performed on a UL PCC as shown in the diagram 426. Also, when the eNB 411 sets, to '11', the 2-bit triggering bit added to the PDCCH as shown in the diagram 418, multiple transmission of four PUCCHs is performed on a UL PCC as shown in the diagram 428.

As described above, various transmission schemes of the multiple PUCCH transmission may be set using a triggering bit described in Table 4, and transmission details may be determined by RRC in advance.

Figure 5:
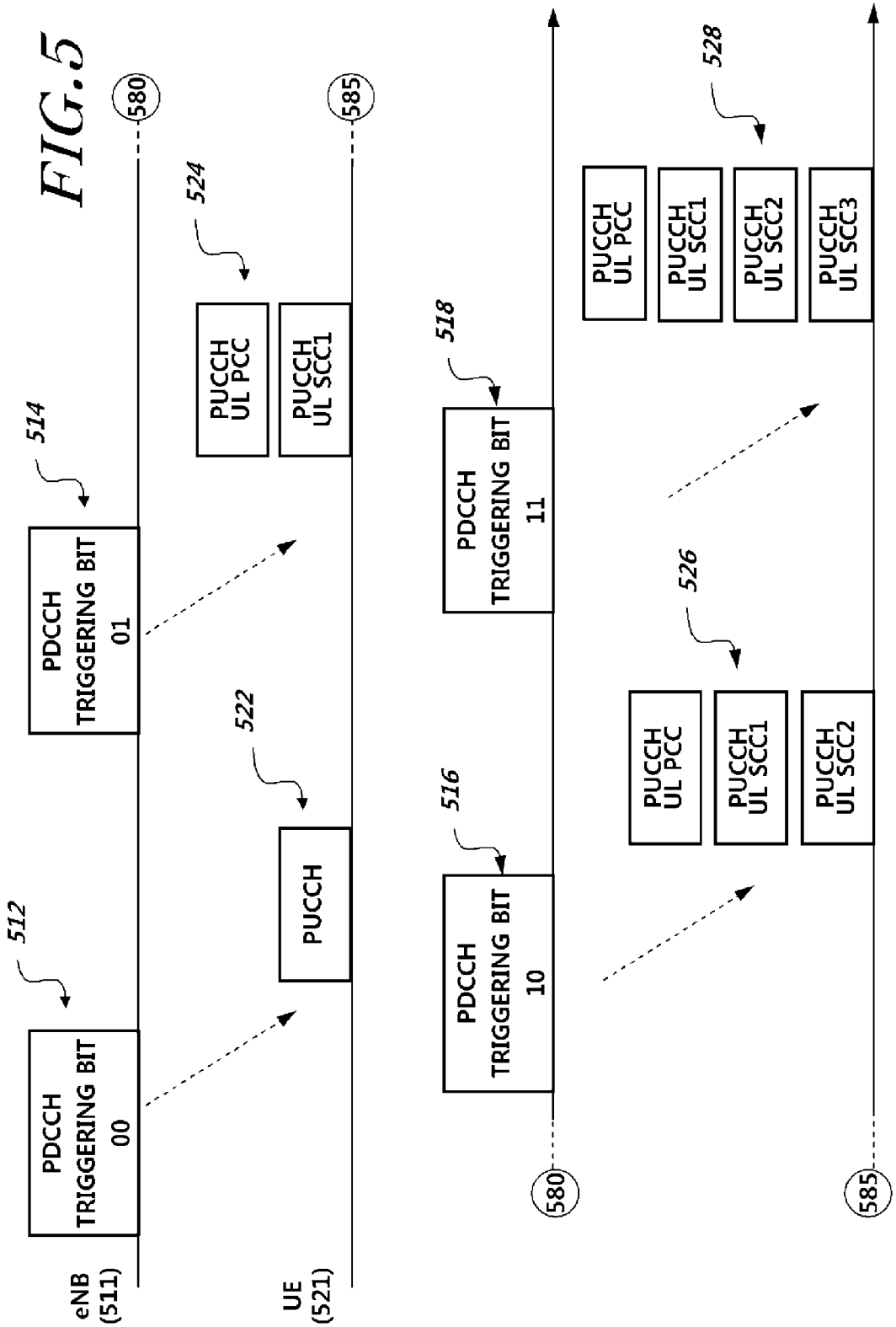
FIG. 5 is a diagram illustrating an example of controlling multiple PUCCH transmission by adding 2 bits to a DCI format according to another embodiment of the present invention.

FIG. 5 is a diagram illustrating an example that controls multiple PUCCH transmission by adding 2 bits to a DCI formation according to another embodiment of the present invention. PUCCH transmission is controlled by two bits, and may be embodied by controlling transmission to be performed through a plurality of CCs unlike FIG. 4 and Table 4. An embodiment that sets a triggering bit is as shown in Table 5.

TABLE 5

| Triggering bit information (2 Bit state) | Meaning |
| --- | --- |
| 00 | Instruct single PUCCH transmission (No triggering) (Single PUCCH transmission (No triggering)) |
| 01 | Instruct multiple PUCCH transmission (1 PUCCH is transmitted on UL PCC and 1 PUCCH is transmitted on UL SCC1) (Multiple PUCCH transmission (1 PUCCH transmission on UL PCC and 1 PUCCH transmission on UL SCC1 in one UL subframe or RRC configuration)) |
| 10 | Instruct multiple PUCCH transmission (1 PUCCH is transmitted on UL PCC, 1 PUCCH is transmitted on UL SCC1, and 1 PUCCH is transmitted on UL SCC2) Multiple PUCCH transmission (1 PUCCH transmission on UL PCC, 1 PUCCH transmission on UL SCC1 and 1 PUCCH transmission on UL SCC2 in one UL subframe or RRC configuration) |
| 11 | Instruct multiple PUCCH transmission (1 PUCCH is transmitted on UL PCC, 1 PUCCH is transmitted on UL SCC1, 1 PUCCH is transmitted on UL SCC2, and 1 PUCCH is transmitted on UL SCC3) Multiple PUCCH transmission (1 PUCCH transmission on UL PCC, 1 PUCCH transmission on UL SCC1, 1 PUCCH transmission on UL SCC2 and 1 PUCCH transmission on UL SCC3 in one UL subframe or RRC configuration) |

As illustrated in FIG. 5, when an eNB 511 sets, to '00', a 2-bit triggering bit added to a PDCCH as shown in the diagram 512, it is a state in which multiple PUCCH transmission is not triggered (no triggering) and thus, a UE 521 transmits a single PUCCH as shown in the diagram 522. When the eNB 511 sets, to '01', the 2-bit triggering bit added to the PDCCH as shown in the diagram 514, multiple PUCCH transmission is triggered as shown in Table 5. Therefore, multiple transmission of a total of 2 PUCCHs is performed, one on a UL PCC and the other on a UL SCC1, as shown in the diagram 524. Also, when the eNB 511 sets, to '10', the 2-bit triggering bit added to the PDCCH as shown in the diagram 516, multiple transmission of three PUCCHs is performed as shown in Table 5. That is, multiple transmission of a total of 3 PUCCHs is performed, one on a UL PCC, another on a UL SCC1, and the other on a UL SCC2, as shown in the diagram 526. In the same manner, when the eNB 511 sets, to '11', the 2-bit triggering bit added to the PDCCH, multiple transmission of four PUCCHs is performed as shown in Table 5. That is, multiple transmission of a total of 4 PUCCHs is performed, one on a UL PCC, another on a UL SCC1, another on a UL SCC2, and the other on a UL SCC 3, as shown in the diagram 528.

As described above, various transmission schemes of the multiple PUCCH transmission may be set based on information indicated by a triggering bit described in the example of Table 5, and transmission details may be defined in advance by an RRC.

As shown in FIGS. 2, 3, 4, and 5, by adding a triggering bit to a PDCCH, an eNB may dynamically control multiple PUCCH transmission. Therefore, the eNB may allow a predetermined UE that has a large amount of downlink traffic to perform multiple PUCCH transmission based on a system environment and the corresponding UE may dramatically improve downlink (DL) throughput performance. Also, UCI (Uplink Control Information) may be effectively transmitted in an uplink. Also, UL PUCCH resources may be controlled by an eNB and thus, PUCCH resources are more flexibly utilized by the eNB from a perspective of loading of a channel environment and an entire network, when compared to a method of performing multiple transmission of a semi-statically predetermined number of PUCCHs. Therefore, it is advantageous in that resource overhead of PUCCH resources may be reduced. Also, information associated with a UL CC through which multiple PUCCHs are transmitted may be controlled by RRC configuration.

A scheme of FIGS. 2, 3, 4, and 5 adds 1 or 2 bits to a DCI format of a PDCCH as a triggering bit, and uses the same as instruction information that dynamically controls transmission of multiple PUCCHs. FIGS. 2, 3, 4, and 5 illustrate a scheme that instructs multiple PUCCH transmission for each PDCCH, whereas a scheme to be described enables or activates multiple PUCCH transmission, enables continuous multiple PUCCH transmission, and disables or releases multiple transmission. This may perform triggering by defining a 'PUCCH C-RNTI'(PUCCH Cell Radio Network Temporary Identifier) value for multiple PUCCH transmission, and setting predetermined bits defined in a PDCCH as bits for multiple PUCCH transmission in advance. Once multiple PUCCH is activated, multiple PUCCH transmission is executable in any UL subframe until it is released based on a predetermined scheme. With respect to a PDSCH indicated by a PDCCH that releases multiple PUCCH transmission or a PDCCH instructs releasing SPS transmission, A/N (Ack/Nack) transmission is required. That is, with respect to the PDSCH indicated by the PDCCH or the PDCCH that instructs releasing SPS transmission, a UE transmits an A/N. In brief, A/N transmission may be configured as follows.

PDSCH with PDCCH
SPS release in PDCCH
multiple PUCCH transmission release in PDCCH To activate or release multiple PUCCH transmission, an eNB scrambles a PDCCH by a PUCCH C-RNTI value and transmits the scrambled PDCCH. Also, the eNB sets predetermined fields of the PDCCH as shown in Table 6 so as to activate multiple PUCCHs and sets predetermined fields of the PDCCH as shown in Table 7 so as to release multiple PUCCHs.

Table 6 shows a value of a field configured for each PDCCH DCI format that instructs activating multiple PUCCH transmission.

TABLE 6

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| HARQ Process number | N/A | FDD: set to '000' TDD: set to '0000' | FDD: set to '000' TDD: set to '0000' |
| Redundancy version | N/A | Set to '00' | For the enabled transport block: set to '00' |

Table 7 shows a value of a field configured for each PDCCH DCI format that instructs releasing multiple PUCCH transmission.

TABLE 7

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1' s | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1' s |

When a signal of a PDCCH DCI format in which values of fields are set as illustrated in Table 6 and Table 7 is received, a UE determines whether multiple PUCCH transmission is activated or released, and activates or releases the multiple PUCCH transmission based on a predetermined scheme.

Figure 6:
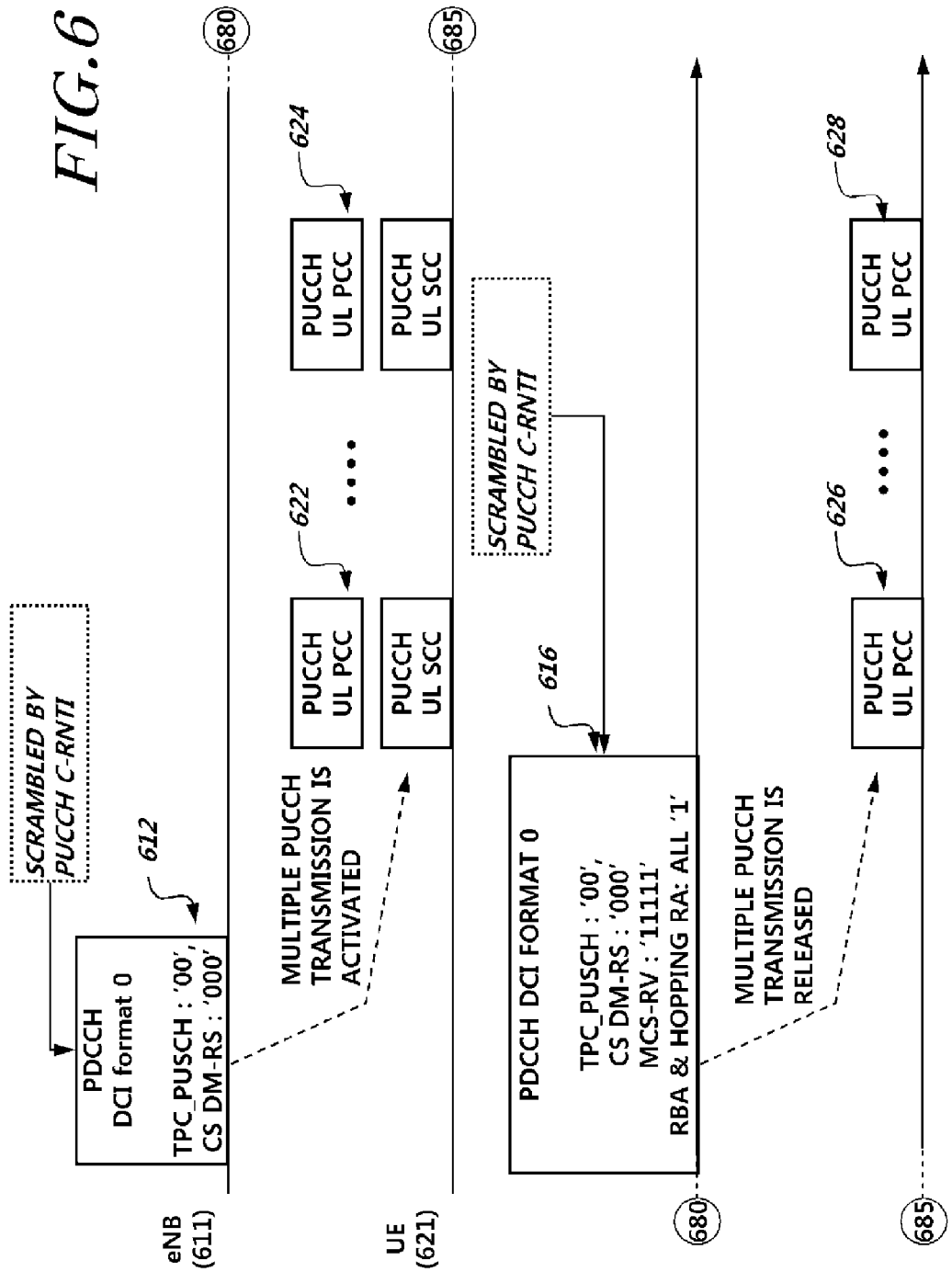
FIG. 6 is a diagram illustrating an example of controlling multiple PUCCH transmission using a predetermined bit of a PDCCH DCI format according to an embodiment of the present invention.

FIG. 6 is a diagram illustrating an example that controls multiple PUCCH transmission using a predetermined bit of a PDCCH DCI format according to an embodiment of the present invention.

As shown in the diagram 612, when it is determined that a DCI format of a PDCCH that is scrambled by a 'PUCCH C-RNTI' in an eNB 611 is 0, a TPC command for scheduled PUSCH' field (TPC_PUSCH) is set to '00', and a 'Cyclic shift DM RS' field (CS-DMRS) is set to '000', according to the setting of Table 6, an UE 621 determines that the received PDCCH activates multiple PUCCH transmission and performs multiple PUCCH transmission as shown in the diagrams 622 and 624. In this example, the multiple PUCCH transmission scheme corresponds to a scheme in which a single PUCCH is transmitted in each of a PCC and an SCC, and the multiple PUCCH transmission scheme is based on a scheme predetermined through RRC signaling and the like. After multiple PUCCH transmission is sufficiently performed, the eNB 611 releases the multiple PUCCH transmission and enables single PUCCH transmission. For this, as shown in the diagram 616, the eNB 611 transmits a PDCCH format 0 in which a DCI format of a PDCCH scrambled by a 'PUCCH C-RNTI' is 0, a 'TPC command for scheduled PUSCH' field (TPC_PUSCH) is set to '00', a 'Cyclic shift DM RS' field (CS-DMRS) is set to '000', a 'Modulation and coding scheme and redundancy version (MCS-RV)' field is set to '11111', and a 'Resource block assignment and hopping resource allocation (RBA & hopping RA)' is set to all '1's according to setting of Table 7. The UE 621 determines that the received PDCCH releases multiple PUCCH transmission and performs single PUCCH transmission as shown in the diagrams 626 and 628.

Although FIG. 6 provides descriptions based on a DCI format 0 from among the settings of Tables 6 and 7, the UE 621 may recognize whether multiple PUCCH transmission is activated based on instruction information even when a PDCCH in which a 'HARQ process number' field (in a case of FDD), such as a DCI format 1/1A, DCI formats 2/2A/2B/2C, and the like, is set to '000' as shown in Table 6 is transmitted as shown in the diagram 612. In a case of TDD, even when a PDCCH in which a 'HARQ process number' field, such as a DCI format 1/1A, DCI formats 2/2A/2B/2C, and the like, is set to '0000' is transmitted as shown in the diagram 612, the UE 621 may recognize whether multiple PUCCH transmission is activated based on instruction information. Also, even when values of an 'HARQ process number' field, a 'Modulation and coding scheme' field, a 'Redundancy version', and a 'Resource block assignment' field of the PDCCH DCI format 1A are set as shown in Table 7, whether multiple PUCCH transmission is released may be recognized based on instruction information.

FIG. 6 illustrates that a UE recognizes a PDCCH scrambled by a 'PUCCH C-RNTI' as information instructing activating or releasing of multiple PUCCH transmission, and activates or releases multiple PUCCH transmission when values of fields of each PDCCH format correspond to Table 6 or Table 7. As a multiple PUCCH transmission scheme, a previously determined scheme such as RRC signaling may be used. The settings of Tables 6 and 7 may be an example and may be configured to include a different field or a different value.

Also, by combining the scheme described in FIG. 6 and Tables 6 and 7 and the scheme described in FIGS. 2 through 5 and Tables 2 through 5, a multiple PUCCH transmission scheme and activation may be simultaneously instructed.

Figure 7:
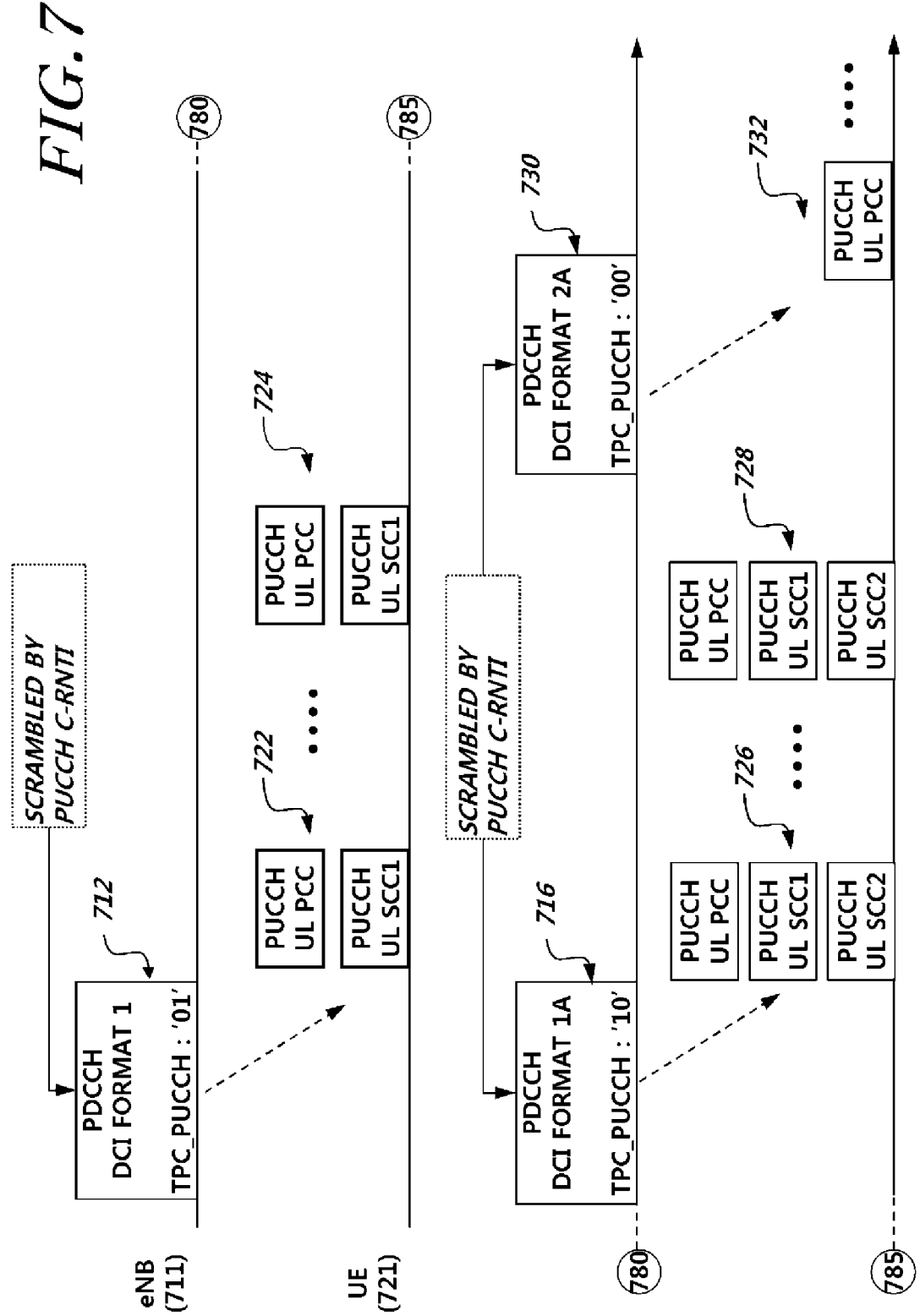
FIG. 7 is a diagram illustrating an example of a detailed control for a multiple PUCCH transmission scheme using a predetermined bit of a PDCCH DCI format according to an embodiment of the present invention.

FIG. 7 is a diagram illustrating an example of a detailed control of a multiple PUCCH transmission scheme using a predetermined bit of a PDCCH DCI format according to an embodiment of the present invention. FIG. 7 may use Table 8 by combining Table 5 and Table 6.

TABLE 8

"TPC command for PUCCH" (TPC_PUCCH) field of DCI format 1/1A/2/2A/2B/2C

| 00 | Instruct single PUCCH transmission |
| 01 | Instruction multiple PUCCH transmission (1 PUCCH on UL PCC and 1 PUCCH on UL SCC1) |
| 10 | Instruct multiple PUCCH transmission (1PUCCH on UL PCC, 1 PUCCH on UL SCC1, and 1PUCCH on UL SCC2) |

TABLE 8-continued

"TPC command for PUCCH" (TPC_PUCCH) field of DCI format 1/1A/2/2A/2B/2C

| 11 | Instruct multiple PUCCH transmission (1 PUCCH on UL PCC, 1 PUCCH on UL SCC1, 1 PUCCH on UL SCC2, and 1 PUCCH on UL SCC3) |

Table 8 may be applied when a PDCCH is scrambled by a 'PUCCH C-RNTI'. When a PDCCH transmitted by an eNB is descrambled by the 'PUCCH C-RNTI', a UE determines that the corresponding PDCCH is instruction information that activates or releases multiple PUCCH transmission. Also, when a predetermined field of the PDCCH is set as shown in Table 8 for each format, the UE may or may not perform multiple PUCCH transmission based on the set value. Unlike DCI formats as shown in Table 8, a DCI Format 0 may be applied when multiple PUCCH transmission is activated or released, and a number of PUCCHs to be transmitted and a CC that is used may be set in advance by RRC signaling so that a user equipment may determine the information. This will be described in detail with reference to FIG. 7.

As shown in the diagram 712, when a DCI format of a PDCCH scrambled by a 'PUCCH C-RNTI' in an eNB 711 is 1, and a 'TPC command for scheduled PUCCH' field (TPC_PUCCH) is set to '01' according to the setting of Table 8, a UE 721 determines that a received PDCCH activates multiple PUCCH transmission, determines a PUCCH transmission scheme indicating that 1 PUCCH is transmitted on a UL PCC and 1 PUCCH is transmitted on a UL SCC1, and performs multiple PUCCH transmission as shown in the diagrams 722 and 724. Subsequently, when the multiple PUCCH transmission scheme is required to be changed, the eNB 711 transmits a PDCCH which is scrambled by a 'PUCCH C-RNTI', and of which a DCI format is 1A and a 'TPC command for scheduled PUCCH' field (TPC_PUCCH) is set to '10' according to the setting of Table 8, as shown in the diagram 716. The UE 721 that receives the PDCCH determines that the received PDCCH activates multiple PUCCH transmission, determines a PUCCH transmission scheme indicating that 1 PUCCH is transmitted on a UL PCC, 1 PUCCH is transmitted on a UL SCC1, and 1 PUCCH is transmitted on a UL SCC2, and performs multiple PUCCH transmission as shown in the diagrams 726 and 728. Subsequently, when the UE 721 performs the multiple PUCCH transmission, the eNB 711 releases the multiple PUCCH transmission so that a single PUCCH is transmitted. For this, the eNB 711 may set a DCI format of a PDCCH scrambled by a 'PUCCH C-RNTI' to 2A and may set a 'TPC command for scheduled PUCCH' field (TPC_PUCCH) to '00', according to a setting of Table 8, as shown in the diagram 730. The UE 721 that receives the diagram 730 determines that multiple PUCCH transmission is released, and transmits a single PUCCH as shown in the diagram 732.

With reference to FIGS. 2 through 7 and Tables 2 through 8, an example in which 1 or 2 bits are added to a PDCCH and the added bits are used as instruction information that controls multiple PUCCH transmission, or an example in which a predetermined field is used as instruction information that controls multiple PUCCH transmission have been described. In addition to the scheme of using a physical control channel such as a PDCCH, multiple PUCCH transmission may be instructed in a PDCCH upper layer.

For example, multiple PUCCH transmission may be controlled by MAC CE signaling (MAC CE) of an L2 layer. The MAC CE signaling may not dynamically operate when compared to a PDCCH, but may be dynamically embodied when compared to RRC signaling. The MAC CE signaling has a lower reliability than RRC signaling. However, the MAC CE signaling may perform faster signaling than RRC signaling and thus, the MAC CE signaling may be applied to multiple PUCCH transmission. The MAC CE may be included in a PDSCH for transmission and thus, when the MAC CE of the received PDSCH instructs starting or stopping multiple PUCCH transmission, or triggers for each time, the UE may start or stop PUCCH transmission, or may perform triggering based on the instruction information.

Also, when multiple PUCCH transmission is instructed, RRC signaling may be used. This may include a scheme of setting a new parameter that controls multiple PUCCH transmission. For example, an RRC parameter called 'MultiplePUCCHTrigger' is newly generated and may be used as a triggering RRC parameter with respect to multiple PUCCH transmission. The RRC parameter is embodied to have a turn-off value as a default value, and to have a feature of a UE-specific parameter. When the UE receives 'MultiplePUCCHTrigger' transmitted by an eNB, the state is switched into a turn-on state and a corresponding UE may start multiple PUCCH transmission.

As described in FIGS. 2 through 7, to control multiple PUCCH or single PUCCH transmission, a base station transmits, to a user equipment that is to perform multiple transmission of control information, instruction information that controls multiple transmission through a physical channel, a MAC which is an upper layer of the physical channel, or RRC signaling. The base station may perform multiple or single reception of control information from the user equipment that receives the instruction information, based on a determined scheme. An example of multiple transceiving of the control information may include multiple PUCCH transceiving.

Figure 8:
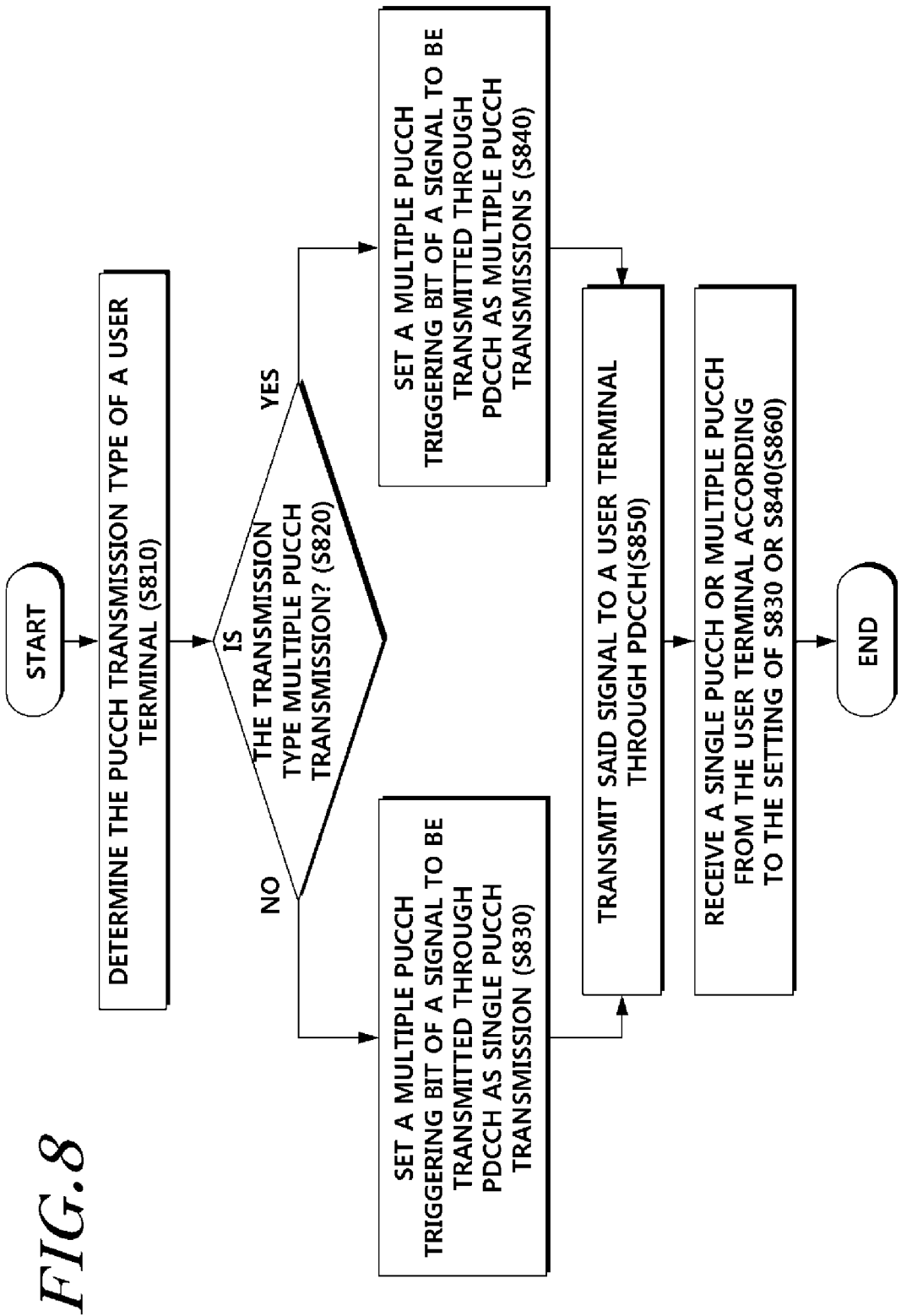
FIG. 8 is a diagram illustrating that a predetermined bit of a signal transmitted through a PDCCH instructs multiple PUCCH transmission or single PUCCH transmission according to an embodiment of the present invention.

FIG. 8 illustrates a case in which a predetermined bit of a signal that is transmitted through a PDCCH instructs multiple PUCCH transmission or single PUCCH transmission according to an embodiment of the present invention. This may be applied to the embodiments of FIGS. 2 through 5.

A base station determines a PUCCH transmission scheme of a user equipment in step S810. Based on whether the transmission scheme is multiple PUCCH transmission or single PUCCH transmission in step S820, the base station sets a signal to be transmitted through a PDCCH (PDCCH transmission), as described in the setting of step S830 or step S840. That is, when the PUCCH transmission scheme of the user equipment is single transmission, the base station sets, to single PUCCH transmission, a multiple PUCCH triggering bit of the signal to be transmitted through the PDCCH in step S830. In Table 2 through Table 5, a predetermined 1 or 2 bits may be set to previously determined information, for example, '0' or '00'. Conversely, when the PUCCH transmission scheme of the user equipment is multiple transmission, the base station sets, to multiple PUCCH transmission, the multiple PUCCH triggering bit of the signal to be transmitted through PDCCH in step S840. Also, in Table 2 through Table 5, 1 or 2 bits are set to previously determined information, for example, '1', '01', '10', and '11'. The set signal is transmitted to the user equipment through the PDCCH in step S850. Subsequently, the base station receives a single PUCCH or multiple PUCCHs from the user equipment based on the setting in step S830 or S840 in step S860.

A multiple PUCCH transmission scheme, that is, information associated with a scale of multiple PUCCH transmission to be performed on a CC may be given through RRC signaling, or may be changed based on the set instruction information.

Figure 9:
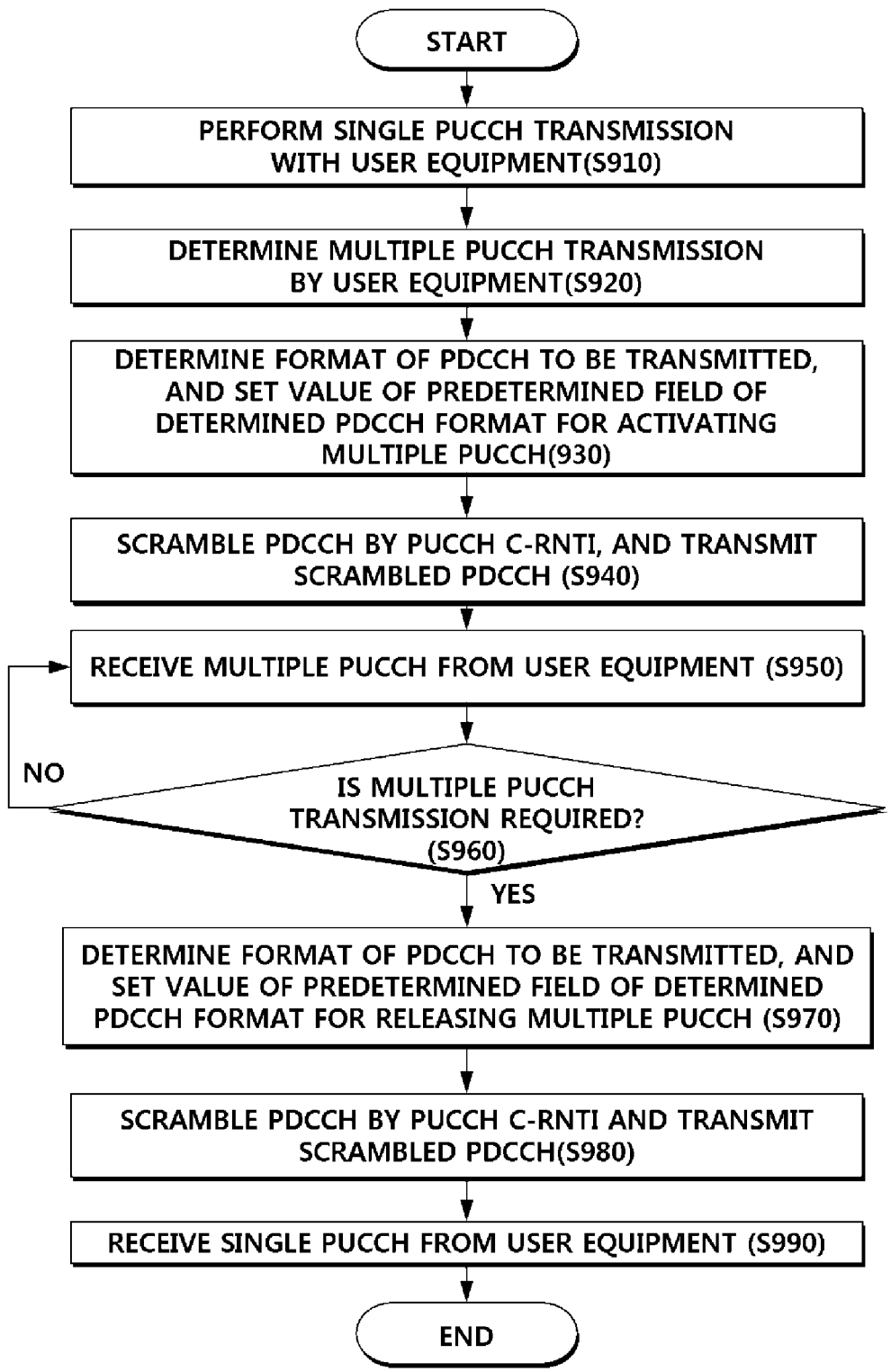
FIG. 9 is a diagram illustrating that multiple PUCCH transmission is activated or released based on a signal transmitted through a specifically scrambled PDCCH according to an embodiment of the present invention.

FIG. 9 illustrates a case in which multiple PUCCH transmission is activated or released based on a signal transmitted through a specifically scrambled PDCCH. This may be applied to the embodiments of FIGS. 6 and 7.

A base station performs single PUCCH transmission with a user equipment in step S910. When an amount of signal that a user equipment is to transmit through a PUCCH increases, when fast signal transmission is required, or when multiple PUCCH transmission is required, the base station determines multiple PUCCH transmission by the user equipment in step S920. The base station determines a format of a PDCCH to be transmitted, and sets a value of a predetermined field of the determined PDCCH format for activating multiple PUCCHs, in step S930. This has been described with reference to Table 6. The base station scrambles, by a PUCCH C-RNTI, the PDCCH of which the value of the predetermined field is set, and transmits the scrambled PDCCH to the user equipment, in step S940. The user equipment that receives the scrambled PDCCH determines that multiple PUCCH transmission is instructed, and starts multiple PUCCH transmission. The base station receives multiple PUCCHs from the user equipment in step S950. Subsequently, the base station determines whether multiple PUCCH transmission is required in step S960, and when multiple transmission is not required, determines a format of the PDCCH to be transmitted, and sets a value of a predetermined field of the determined PDCCH formation so as to release multiple PUCCHs in step S970. This has been described with reference to Table 7. After scrambling the PDCCH by a PUCCH C-RNTI and transmitting the scrambled PDCCH to the user equipment in step S980, the base station receives a single PUCCH from the user equipment in step S990.

As described in Table 8 and FIG. 7, in addition to activation of multiple PUCCH transmission, a multiple PUCCH transmission scheme may be set.

Controlling multiple PUCCH transmission using through a MAC CE or RRC signaling, in addition to using the PDCCH has been described. The base station may control multiple PDCCH transmission by operating as described in FIG. 10.

Figure 10:
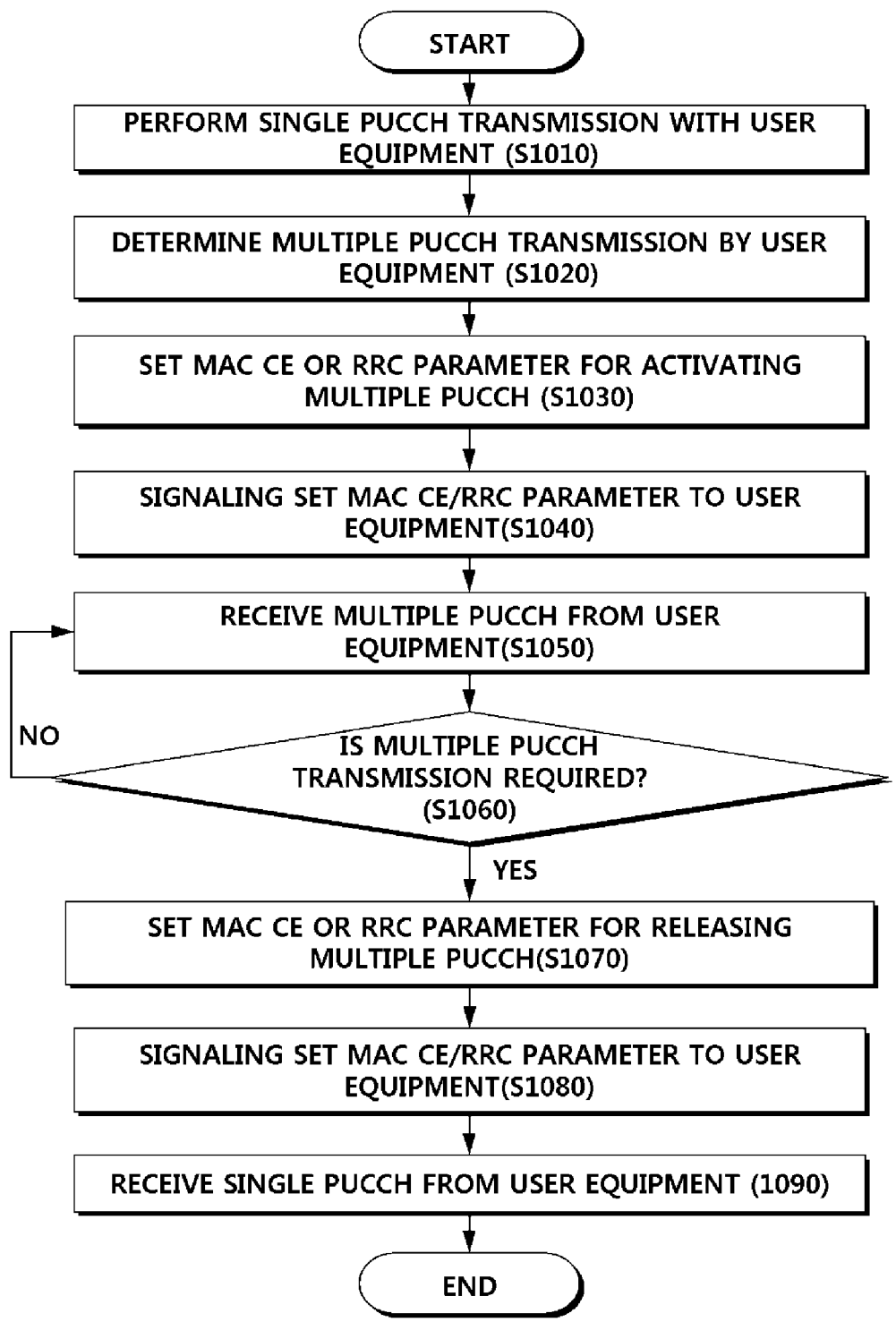
FIG. 10 is a diagram illustrating that multiple PUCCH transmission is activated or released in an upper layer of a physical layer according to an embodiment of the present invention.

FIG. 10 is a diagram illustrating that multiple PUCCH transmission is activated or released in an upper layer of a physical layer according to an embodiment of the present invention.

The base station performs single PUCCH transmission with a user equipment in step S1010. When an amount of signal that the user equipment is to transmit through a PUCCH increases, when fast signal transmission is required, and when multiple PUCCH transmission is required, the base station determines multiple PUCCH transmission by the user equipment in step S1020. The base station sets a MAC CE or an RRC parameter to activate multiple PUCCHs of the user equipment in step S1030. The base station performs signaling of the set MAC CE/RRC parameter to the user equipment in step S1040. The signaled MAC CE/RRC parameter may be included in a PDSCH for transmission. Subsequently, the user equipment determines that multiple PUCCH transmission is instructed and starts multiple PUCCH transmission. The base station receives multiple PUCCHs from the user equipment in step S1050. Subsequently, the base station determines whether multiple PUCCH transmission is required in step S1060, and when multiple transmission is not required, sets a MAC CE or an RRC parameter for releasing multiple PUCCHs in step S1070. After signaling of the set MAC CE/RRC parameter to the user equipment in step S1080, the base station receives a single PUCCH from the user equipment in step S1090.

As described in FIGS. 2 through 7, to perform multiple PUCCHs or single PUCCH transmission, the user equipment receives, from the base station, instruction information that controls multiple transmission of control information through a physical channel, an MAC which is an upper layer of the physical channel, or RRC signaling, and performs multiple transmission of the control information when the instruction information instructs multiple transmission by the user equipment. An example of the multiple transceiving of the control information includes multiple PUCCH transceiving, which will be described in detail as follows.

Figure 11:
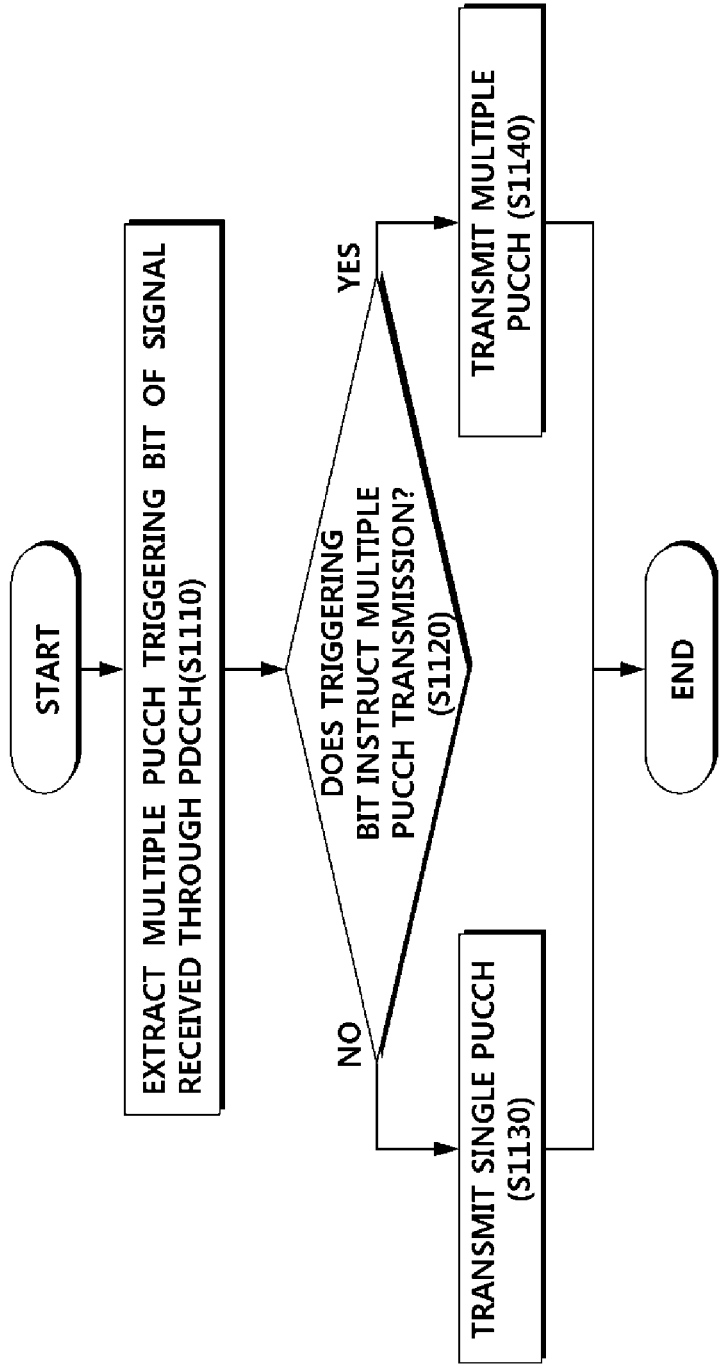
FIG. 11 is a diagram illustrating that a predetermined bit of a signal that is transmitted through a PDCCH instructs multiple PUCCH transmission or single PUCCH transmission according to an embodiment of the present invention.

FIG. 11 illustrates a case in which a predetermined bit of a signal that is transmitted through a PDCCH instructs multiple PUCCH transmission or single PUCCH transmission according to an embodiment of the present invention. This may be applied to the embodiments of FIGS. 2 through 5. For multiple PUCCH transmission, 1 or 2 bits may be added to a PDCCH. Additionally, multiple PUCCH transmission may be controlled by utilizing fields of a conventional DCI format (TPC in DL grant, DAI, and the like).

A user equipment extracts a multiple PUCCH triggering bit of a signal received through a PDCCH in step S1110, and determines whether the triggering bit instructs multiple PUCCH transmission in step S1120. As the triggering bit, predetermined 1 or 2 bits in Table 5 may be set as previously determined information.

When the triggering bit instructs single PUCCH transmission, the user equipment transmits a single PUCCH in step S1130. Conversely, when the triggering bit instructs multiple PUCCH transmission, the user equipment transmits multiple PUCCHs in step S1140.

A multiple PUCCH transmission scheme, that is, information associated with a scale of multiple PUCCH transmission to be performed on a CC, may be given through RRC signaling, or may be changed based on the set instruction information.

Figure 12:
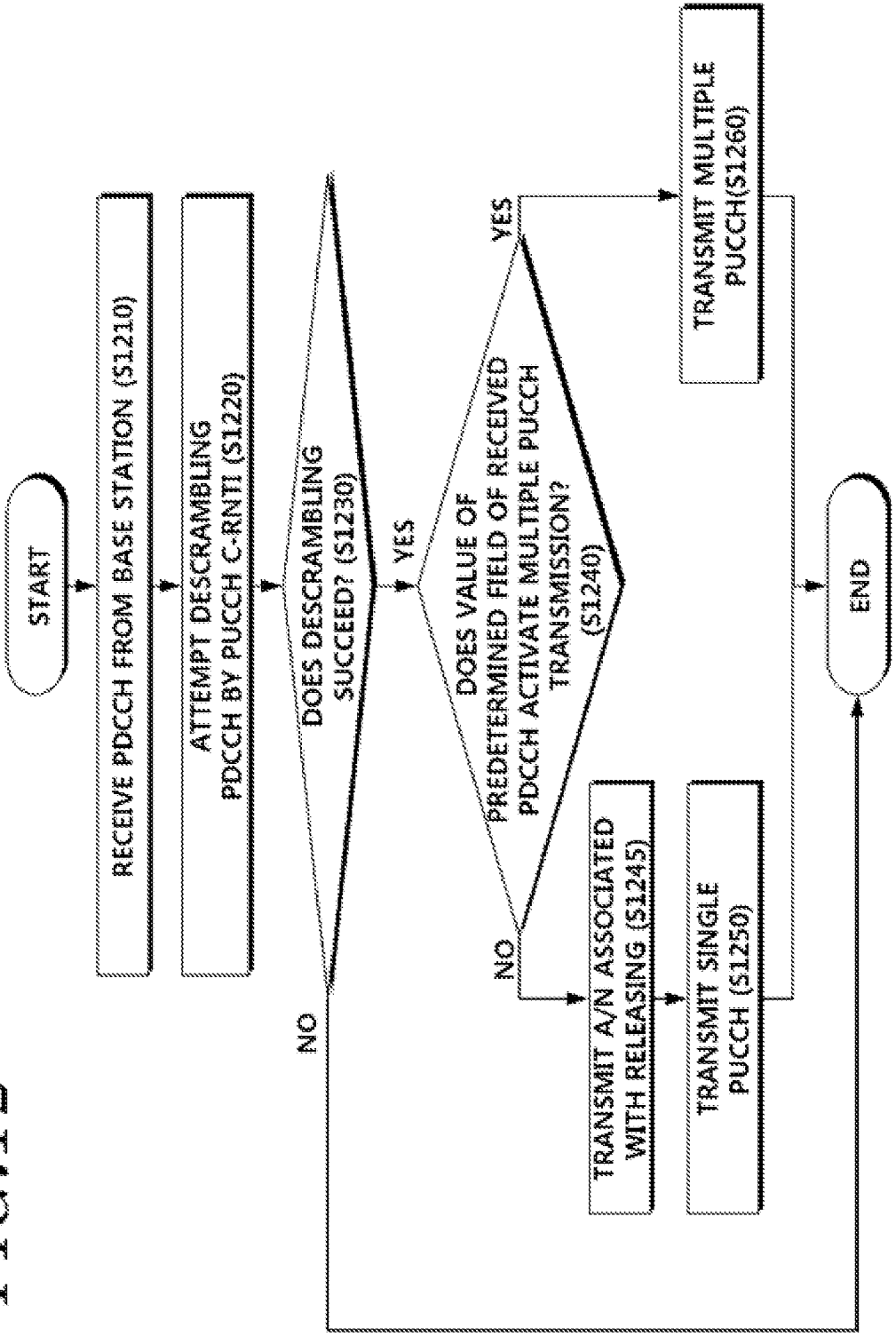
FIG. 12 is a diagram illustrating that multiple PUCCH transmission is activated or released based on a signal transmitted through a specifically scrambled PDCCH according to an embodiment of the present invention.

FIG. 12 illustrates a case in which multiple PUCCH transmission is activated or released based on a signal transmitted through a specifically scrambled PDCCH. This may be applied to the embodiments of FIGS. 6 and 7.

A user equipment receives a PDCCH from a base station in step S1210 and attempts descrambling a PDCCH by a PUCCH C-RNTI in step S1220. When descrambling succeeds in step S1230, the user equipment determines whether a value of a predetermined field of the received PDCCH activates multiple PUCCH transmission in step S1240. This may be understood by referring to Table 6 and 7. When multiple PUCCH transmission is activated as shown in the configuration of Table 6, the user equipment may transmit multiple PUCCHs based on a predetermined scheme in step S1260. Also, until instruction information for releasing is separately received, multiple PUCCHs are continuously transmitted. Conversely, when multiple PUCCH transmission is released as shown in the configuration of Table 7, the user equipment transmits ACK/NACK with respect to reception of information that instructs releasing in step S1245, interrupts multiple PUCCH transmission, and performs single PUCCH transmission in step S1250.

As described in Table 8 and FIG. 7, the predetermined field of the PDCCH of which descrambling succeeds activates multiple transmission of a PUCCH and also instructs a multiple PUCCH transmission scheme.

Figure 13:
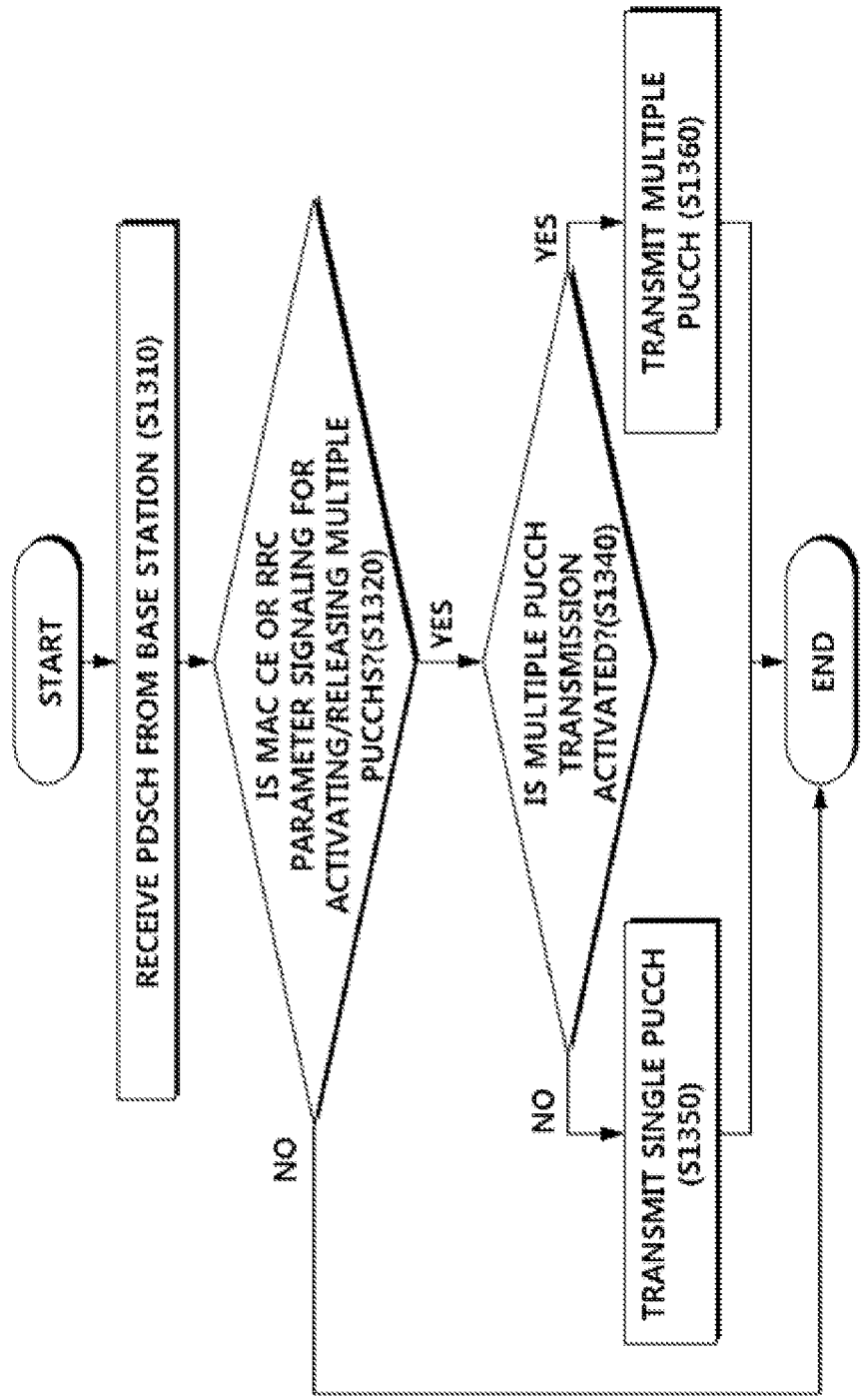
FIG. 13 is a diagram illustrating that multiple PUCCH transmission is activated or released using a MAC CE or RRC signaling according to an embodiment of the present invention.

FIG. 13 illustrates a case in which multiple PUCCH transmission is activated or released through an MAC CE or RRC signaling according to an embodiment of the present invention.

A user equipment receives a PDSCH from a base station in step S1310, and determines whether the received PDSCH is an MAC CE or signaling of an RRC parameter for activating/releasing multiple PUCCHs in step S1320. When the PDSCH activates/releases the multiple PUCCHs, the user equipment determines whether the received MAC CE or RRC signaling activates multiple PUCCH transmission in step S1340. When the MAC CE or RRC signaling activates the multiple PUCCH transmission, the user equipment transmits multiple PUCCHs based on a scheme that is agreed between the user equipment and the base station in step S1360. Also, until separate instruction information for releasing is determined through the MAC CE or RRC signaling, multiple PUCCHs are continuously transmitted. Conversely, when multiple PUCCH transmission is released, the user equipment interrupts multiple PUCCH transmission and performs single PUCCH transmission in step S1350.

FIGS. 8 through 10 correspond to operations of a base station. A configuration of the base station that embodies the operations is described in FIG. 14.

Figure 14:
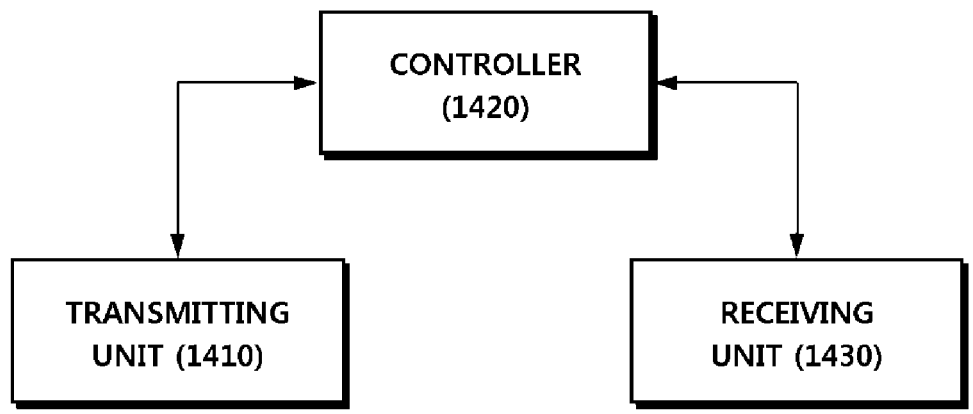
FIG. 14 is a diagram illustrating a configuration of a base station that dynamically controls multiple transceiving of control information in a wireless communication system.

FIG. 14 is a diagram illustrating a configuration of a base station that dynamically controls multiple transceiving of control information in a wireless communication system. The overall configuration includes a controller 1420, a transmitting unit 1410, and a receiving unit 1430. The controller 1420 generates instruction information that controls multiple transmission for a user equipment that is to perform multiple transmission of control information. The transmitting unit 1410 transmits the generated instruction information through a physical channel, a MAC which is an upper layer of the physical channel, or RRC signaling, and the receiving unit 1430 performs multiple reception of the control information from the user equipment when the instruction information instructs multiple transmission by the user equipment.

In particular, by applying FIG. 8, when the instruction information is transmitted through a physical channel, the physical channel may be a PDCCH. The instruction information corresponds to 1 or 2 bits of control information transmitted through the PDCCH, and the instruction information may trigger multiple transmission of control information through a PUCCH.

Also, by applying FIG. 9, when the instruction information is transmitted through a physical channel, the instruction information is a field of control information transmitted through a PDCCH scrambled by a PUCCH C-RNTI, and the instruction information may activate or release multiple transmission of the control information through a PUCCH.

By applying FIG. 10, the instruction information may be included in an MAC CE/RRC parameter for signaling. In this case, the MAC CE/RRC parameter may be included in a PDSCH and may be transmitted to a user equipment.

FIGS. 11 through 13 correspond to operations of a user equipment. A configuration of the user equipment that embodies the operations is described in FIG. 15.

Figure 15:
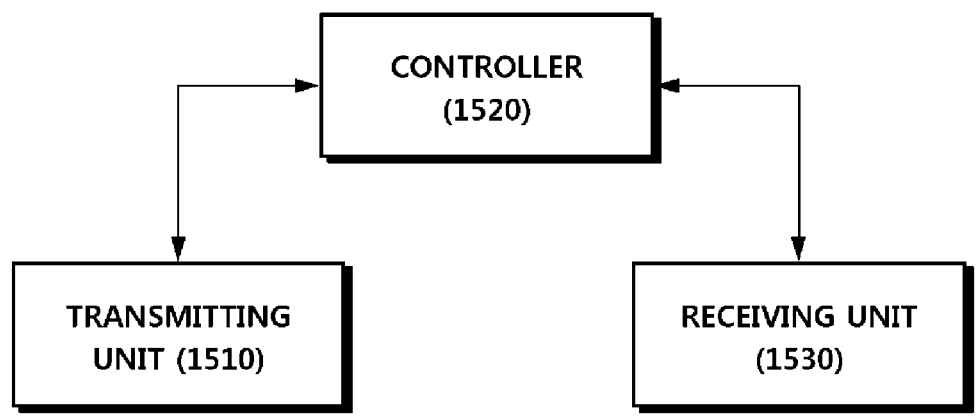
FIG. 15 is a diagram illustrating a configuration of a user equipment that dynamically controls multiple transceiving of control information in a wireless communication system.

FIG. 15 is a diagram illustrating a configuration of a user equipment that dynamically controls multiple transceiving of control information in a wireless communication system. The overall configuration includes a controller 1520, a transmitting unit 1510, and a receiving unit 1530.

The transmitting unit 1510 performs multiple transmission of control information to a base station. Simultaneous PUCCH transmission as described above may be performed. The receiving unit 1530 receives, from the base station, instruction information that controls multiple transmission of control information through a physical channel, a MAC which is an upper layer of the physical channel, or RRC signaling. The controller 1520 determines whether the instruction information instructs the user equipment to perform multiple transmission, and controls the transmitting unit to perform multiple transmission of the control information.

In particular, by applying FIG. 11, when the instruction information is transmitted through a physical channel, the physical channel may be a PDCCH. Therefore, the user equipment recognizes 1 or 2 bits of control information transmitted through the PDCCH as a triggering bit, and controls multiple or single transmission of the control information through a PUCCH.

By applying FIG. 12, when the instruction information is transmitted through a physical channel, the instruction information is a field of control information transmitted through a PDCCH scrambled by a PUCCH C-RNTI. Therefore, the user equipment descrambles the received PDCCH by a PUCCH C-RNTI. When descrambling succeeds, the user equipment may activate or release multiple transmission of the control information through a PUCCH based on instruction information for activating/releasing.

By applying FIG. 13, the instruction information may be included in a MAC CE/RRC parameter for signaling. In this example, the MAC CE/RRC parameter may be included in a PDSCH, and a user equipment may receive the same. In this example, the user equipment receives the PDSCH and recognizes whether the included information activates or releases multiple PUCCHs, and activates or releases multiple transmission of the control information through a PUCCH.

Through various methods that instruct multiple PUCCH transmission, multiple PUCCH transmission efficiency and system throughput may be effectively improved.

That is, multiple PUCCH transmission enables effective UL UCI transmission. Also, multiple PUCCH transmission may be trigged without a large change in an existing system and thus, an eNB may effectively perform signaling to a UE, and it may be helpful for improving the overall system performance.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of receiving multiple Physical Uplink Control Channels (PUCCHs), the method comprising:

transmitting, by a base station (BS), instruction information that indicates transmission of multiple PUCCHs to a user equipment (UE); and
receiving the multiple PUCCHs from the UE based on the instruction information,
wherein the instruction information is transmitted through a Radio Resource Control (RRC) signaling and the RRC signaling comprises information associated with a number of PUCCH transmissions to be performed in at least one component carrier, and
wherein, when the instruction information corresponds to a field forming a Physical Downlink Control Channel (PDCCH) signal scrambled by a PUCCH Cell Radio Network Temporary Identifier (C-RNTI), the instruction information activates or releases transmission of the multiple PUCCHs, and a transmission scheme for the multiple PUCCHs is set in a TPC_PUCCH field (Transmit Power Control command for PUCCH) of the PDCCH or is instructed based on a scheme instructed through RRC signaling.

2. The method of claim 1, wherein, when the instruction information corresponds to information of 1 or 2 bits in the field forming a Physical Downlink Control Channel (PDCCH) signal, the instruction information instructs one of triggering of transmission of the multiple PUCCHs, instructing a transmission scheme for the multiple PUCCHs, and interruption of transmission of the multiple PUCCHs.

3. A method of transmitting multiple Physical Uplink Control Channels (PUCCHs), the method comprising:
receiving, by a user equipment (UE), instruction information that indicates transmission of multiple PUCCHs from a base station;
transmitting the multiple PUCCHs to the base station based on the instruction information;
when the instruction information corresponds to a field forming a Physical Downlink Control Channel (PDCCH) signal scrambled by a PUCCH Cell Radio Network Temporary Identifier (C-RNTI), descrambling the PDCCH by a PUCCH C-RNTI; and
activating or releasing transmission of the multiple PUCCHs based on a field forming a descrambled signal when the descrambling succeeds, and transmitting the multiple PUCCHs based on a scheme set in a TPC_PUCCH field (Transmit Power Control command for PUCCH) of the descrambled PDCCH or a scheme instructed through a Radio Resource Control (RRC) signaling,
wherein the instruction information is received through a Radio Resource Control (RRC) signaling comprising information associated with a number of PUCCH transmissions to be performed in at least one component carrier.

4. The method of claim 3, further comprising:
determining whether the instruction information instructs one of triggering of transmission of the multiple PUCCHs, instructing a transmission scheme for the multiple PUCCHs, and interruption of transmission of the multiple PUCCHs,
wherein, when the instruction information corresponds to information of 1 or 2 bits in the field forming a Physical Downlink Control Channel (PDCCH) signal.

5. An apparatus to receive multiple Physical Uplink Control Channels (PUCCHs), the apparatus comprising:
a controller to generate instruction information that indicates transmission of multiple PUCCHs for a user equipment (UE);
a transmitting unit to transmit the generated instruction information to the UE; and
a receiving unit to receive the multiple PUCCHs from the UE based on the instruction information,
wherein the instruction information is transmitted through a Radio Resource Control (RRC) signaling and the RRC signaling comprises information associated with a number of PUCCH transmissions to be performed in at least one component carrier, and
wherein, when the instruction information corresponds to a field forming a Physical Downlink Control Channel (PDCCH) signal scrambled by a PUCCH Cell Radio Network Temporary Identifier (C-RNTI), the instruction information activates or releases transmission of multiple PUCCHs, and a transmission scheme for the multiple PUCCHs is set in a TPC_PUCCH field (Transmit Power Control command for PUCCH) of the PDCCH or instructed based on a scheme instructed through RRC signaling.

6. The apparatus of claim 5, wherein, when the instruction information corresponds to information of 1 or 2 bits in the field forming a Physical Downlink Control Channel (PDCCH) signal, the instruction information instructs one of triggering of transmission of the multiple PUCCHs, instructing a transmission scheme for the multiple PUCCHs, and interruption of transmission of the multiple PUCCHs.

7. An apparatus to dynamically transmit multiple Physical Uplink Control Channels (PUCCHs), the apparatus comprising:
a transmitting unit to transmit multiple PUCCHs to a base station;
a receiving unit to receive, from the base station, instruction information that indicates transmission of multiple PUCCHs; and
a controller to control the transmitting unit to transmit the multiple PUCCHs to the base station based on the instruction information,
wherein the instruction information is received through a Radio Resource Control (RRC) signaling and the RRC signaling comprises information associated with a number of PUCCH transmissions to be performed in at least one component carrier, and
wherein, when the instruction information corresponds to a field forming a Physical Downlink Control Channel (PDCCH) signal scrambled by a PUCCH Cell Radio Network Temporary Identifier (C-RNTI), the controller descrambles the PDCCH by a PUCCH C-RNTI, and activates or releases transmission of the multiple PUCCHs based on a field forming a descrambled signal when the descrambling succeeds, and controls the transmitting unit to transmit the multiple PUCCHs based on a scheme that is set in a TPC_PUCCH field (Transmit Power Control command for PUCCH) of the descrambled PDCCH or a scheme instructed through RRC signaling.

8. The apparatus of claim 7, wherein, when the instruction information corresponds to information of 1 or 2 bits in the field forming a Physical Downlink Control Channel (PDCCH) signal, the controller determines whether the instruction information instructs one of triggering of transmission of the multiple PUCCHs, instructing a transmission scheme for the multiple PUCCHs, and interruption of transmission of the multiple PUCCHs.

* * * * *